United States Patent [19]
Greene

[11] Patent Number: 4,945,547
[45] Date of Patent: Jul. 31, 1990

[54] LASER BEAM PROCESSING APPARATUS

[75] Inventor: Benny A. Greene, Fadden, Australia

[73] Assignee: Electro Optic Systems Pty. Ltd., New South Wales, Australia

[21] Appl. No.: 358,521

[22] Filed: May 30, 1989

Related U.S. Application Data

[63] Continuation of Ser. No. 86,125, filed as PCT AU86/00291 on Oct. 4, 1986 published as WO87/02197 on Apr. 9, 1987, abandoned.

[30] Foreign Application Priority Data

Oct. 4, 1985 [AU] Australia ............................ 2711/85
Oct. 4, 1985 [AU] Australia ............................ 2712/85
Oct. 4, 1985 [WO] PCT Int'l Appl. ................. PCT/AU86/00291

[51] Int. Cl.$^5$ ........................ H01S 3/083; H01S 3/03; H01S 3/07
[52] U.S. Cl. ..................................... 372/94; 372/92; 372/87; 372/61; 372/66
[58] Field of Search ...................... 372/92, 94, 95, 87, 372/108, 61–67

[56] References Cited

U.S. PATENT DOCUMENTS

| | | | |
|---|---|---|---|
| 3,140,451 | 7/1964 | Fox | 372/66 |
| 3,248,671 | 4/1966 | Dill et al. | 372/94 |
| 3,308,395 | 3/1967 | Sorokin | 372/66 |
| 3,361,987 | 1/1968 | De Maria | 372/94 |
| 3,526,850 | 9/1970 | Dillon et al. | 372/66 |
| 3,614,659 | 10/1971 | Rigrod | 372/94 |
| 3,657,733 | 4/1972 | Shapiro et al. | 372/94 |
| 4,039,962 | 8/1977 | Hughes | 372/93 |
| 4,093,924 | 6/1978 | Farcy | 372/93 |
| 4,744,090 | 5/1988 | Freiberg | 372/108 |
| 4,779,286 | 10/1988 | Wheatley | 372/61 |
| 4,815,094 | 3/1989 | Cantoni | 372/66 |

Primary Examiner—William L. Sikes
Assistant Examiner—Georgia Y. Epps
Attorney, Agent, or Firm—Sughrue, Mion, Zinn, Macpeak & Seas

[57] ABSTRACT

A laser beam processing apparatus includes a body providing a generally cylindrical bounding structure for a cavity. A window allows admission of an incident light beam into the cavity and emission of a laser beam from the cavity. A plurality of reflectors are arranged to sequentially reflect the light beam and/or light generated thereby along a light path which is generally polygonal as viewed from an end of the cavity. Laser material is disposed in the light path whereby the light generated by the light beam includes light which is derived by stimulated emission from the laser material.

21 Claims, 2 Drawing Sheets

LASER BEAM PROCESSING APPARATUS

This is a continuation, of application Ser. No. 07/086,125 filed as PCT AU86/00291 on Oct. 4, 1986, published as WO87/02197 on Apr. 9, 1987, now abandoned.

FIELD OF INVENTION

This application relates to laser apparatus which may be configured either as laser amplifier or as a laser resonator.

BACKGROUND ART

In the design of optimum lasers, especially high power lasers, certain physical requirements have been recognized as desirable. These include maximum active volume, maximum beam cross-sectional area, and maximum surface area of the laser material available for cooling. The configuration of the laser should also align thermal profiles along the laser axis, and should suppress parasitic modes actively or passively.

Prior approaches to these desiderata have included zig-zag and stack configurations. In the former, the beam executes a zig-zag path, e.g. sawtooth or square, while a particular form of a stack configuration is the ring laser in which the light beam successively longitudinally traverses laser amplifiers arranged substantially in a ring. A common feature of the family of laser designs embodying zig-zag and stack configurations is that pumping is distributed longitudinally, either continuously or discretely. For high power applications, this feature has several disadvantages and limitations: pumping is non-uniform and inefficient, the devices tend to be physically large, and cooling is generally inefficient.

Some stack configurations, such as a nest of layers inclined to the incident beam, do allow a good circulation of cooling gas about the layers but still exhibit several disadvantages. In particular, pumping is non-uniform and inefficient, and cooling, since it is by gas only, requires extremely low temperature gases to operate.

SUMMARY OF THE INVENTION

It is an object of the invention to provide laser apparatus which provides improved performance over prior art arrangements.

The invention accordingly provides:
laser apparatus comprising:
a body providing a generally cylindrical bounding structure for a cavity;
means to admit an incident light beam to the cavity and to emit a laser beam from the cavity;
reflective means arranged to multiply reflect said light beam and/or light generated thereby along a light path which is generally polygonal as viewed from an end of the cavity;
wherein, in use of the apparatus, laser material is disposed in said path whereby said light generated by said light beam includes light which is derived by stimulated emission from said laser material.

As understood herein, the term "cylindrical" is not limited to cylinders of circular cross-section but also embraces those of general polygonal cross-section. Moreover, the term "polygonal" is not limited to a closed planar loop but extends to offset unclosed loops.

Advantageously, said light path generally spirals along the cavity whereby said light beam and/or light generated thereby executes plural circuits of the cavity.

The reflective means preferably comprises three or more, most preferably at least five, substantially flat reflective interfaces which may be elongate parallel to the axis of said cylindrical bounding structure and which together form a reflective structure of polygonal, preferably regular polygonal, cross-section about said cavity.

In an alternative embodiment, the cavity is of circular annular cross-section.

The apparatus preferably includes laser material arranged in plural relatively thin flat segments in front of said reflective interfaces and so defines said cylindrical bounding structure, whereby said light path traverses the thin dimension of the material.

Alternatively, the laser material may be a gas which in use fills said cavity and said apparatus then further includes means for exciting the gas.

The gas exciting means may comprise electrical discharge means including an electrode disposed centrally within said cavity. The centrally disposed electrode may conveniently house a reservoir for the gas.

The apparatus may be configured as a laser amplifier or as a laser resonator. In the latter case, the apparatus may further include reflective interfaces orthogonally intersecting said light path. One of these interfaces may be part-reflective, part transmissive so as to form the laser beam emission means.

The invention also provides a method of generating or amplifying a laser beam comprising directing the incident light and/or light generated thereby along a light path which traverses laser material and is generally polygonal.

BRIEF DESCRIPTION OF DRAWINGS

The invention will now be further described, by way of example only, with reference to the accompanying drawings, in which.

BEST MODES FOR CARRYING OUT THE INVENTION

Figure 1:
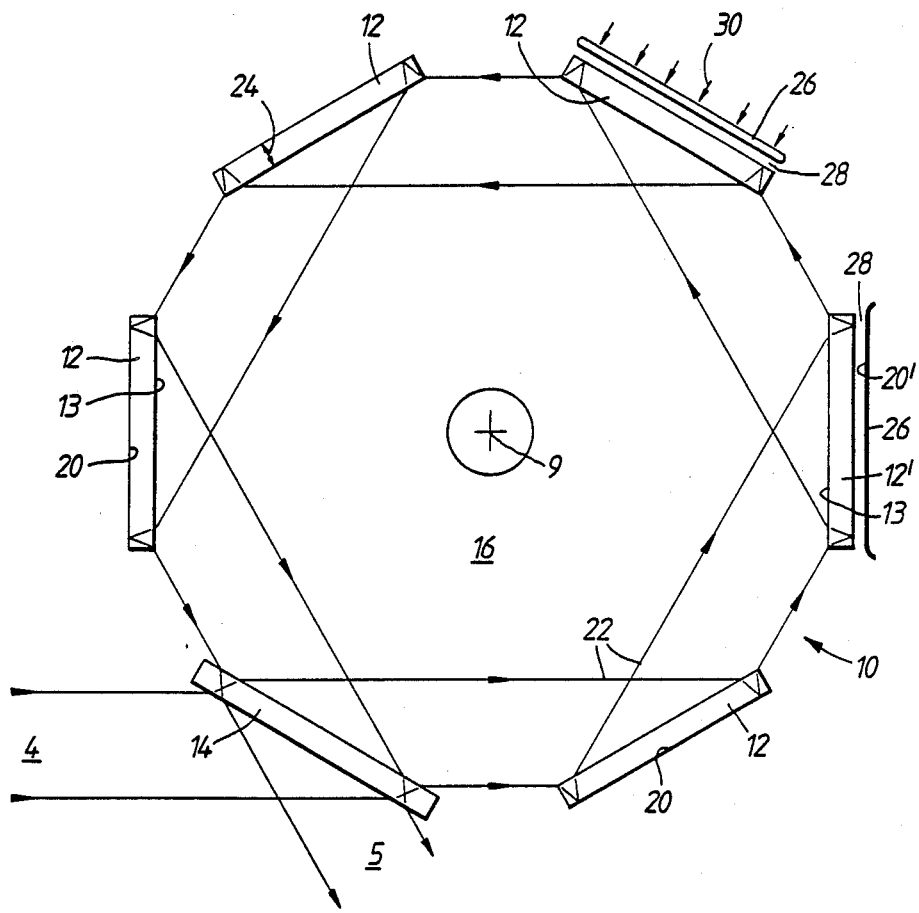
FIG. 1 is a highly schematic cross-sectional view of a first embodiment of laser apparatus according to the invention, configured as a laser amplifier.

The laser apparatus 10 depicted in FIG. 1 includes five relatively thin flat segments 12 of laser material and a glass window 14 which together form the operative parts of a body providing a generally cylindrical bounding structure for a cavity 16. The other parts of the body, including an outer housing and mountings for segments 12 and window 14, are not shown in FIG. 1 so as to highlight the important preferred features of the apparatus. The front or inside faces 13 of laser segments 12 exhibit a regular hexagonal configuration in cross-section normal to the axis 9 of cavity 16. Laser segments 12 may be any suitable lasing material, solid, liquid or gas.

Window 14 forms both means to admit an incident light beam 4 (which may be a laser beam or otherwise) to the cavity, and means to emit a laser beam 5 from the cavity.

Each of the laser segments 12 is backed by a reflective interface 20 in optical contact with the laser material. Interfaces 20 may be structural or a coating on the back face of the laser segments. They together form reflective means arranged to multiply reflect incident light beam 4, and/or light generated thereby, along a light path which is indicated by ray lines 22 and which is generally hexagonal as viewed from the end of cavity 16: this is equivalent to the view seen in FIG. 1. Interfaces 20 may reflect the laser wavelength, the optical pump wavelength or both. The light in fact traverses the thin dimension 24 of each so that light generated by light beam 4 includes light which is derived by stimulated emission from the laser material of the segments 12. The aforementioned front faces 13 of segments 12 are preferably coated or otherwise treated to minimize reflection of light incident on these faces.

In practice, light path 22 may spiral along cavity 16, and thereby execute plural circuits of the cavity. In that event, window 14 will not be required and would be replaced by a sixth laser segment and accompanying reflective interface: the beam would enter and exit at the respective ends of the cavity. To enhance the gain-length of the amplifier, segments 12 may be made elongate, perhaps highly elongate, parallel to cavity axis 9. Alternatively, each segment 12 may itself be subdivided into multiple facets or boules. The laser beam need not execute a whole number of spirals, and may exit the device at any angle depending on the length of laser material in the cavity.

Each laser segment 12 is further backed by structure 26 (shown only for two of the segments) defining means such as plural channels 28 for circulating cooling fluid adjacent the laser segment during operation of the apparatus. In a modified embodiment (shown for one segment only), the inside face of structure 26 may form the reflective interface 20' for the adjacent laser segment 12', so that, then, the cooling fluid circulates between the laser segment 12' and the reflective interface 20'.

In an alternative embodiment (not specifically illustrated), the number of sides in the polygonal cross-section of cavity 16 can be chosen to match the refractive index of the laser material so that the beam enters and exits the material at or near Brewster's angle, removing the need for coatings and producing an extremely polarised output.

The device illustrated in FIG. 1 has a number of advantages over prior zig-zag, stack and ring laser configurations, as follows:

simplification of pump design: a single flashlamp only is required to generate incident beam 4, as opposed to the lamp arrays of prior configurations;
uniformity of pumping is ensured;
containment of pump energy is greatly facilitated, especially for high efficiency applications;
pumping efficiency is increased significantly;
the circular symmetry facilitates simplified cooling, for example by external radial fins to sink energy. Cooling can be liquid (outer face) and gas (inner) or gas/gas. Radiative cooling is indicated at 30 in FIG. 1;
the device is extremely compact;
the gain medium is segmented, so no large "pieces" of gain medium are required. This is an advantage when dealing with most laser crystals, as large crystals are not easily grown without some imperfections. The shape and aspect ratio of the crystals required is well suited to most crystal boules;
the circular symmetry assists in the retention of angular fidelity through a range of temperatures, that is, thermal distortions are largely self-compensated by the configuration;
antireflective coatings on the inner faces of the laser segments may be avoided as suggested by arranging for the input and output beams to both be at Brewster's angle. Normally in prior devices, a broadband antireflective coating would be required to couple pump energy into the gain medium. However, these coatings are not required either in the device illustrated in FIG. 1, as reflected pump energy is totally contained in the device, and must be absorbed eventually;
the beam quality is very high, and nearly 100% polarised;
no special optics are required to change the beam cross-section from circular to elliptical. This is done simply by the angle of incidence chosen (e.g. Brewster's angle). Although this can be done in at least some of the prior art devices, this is not without significant penalties in terms of the longitudinal extension (lengthening) of the device, compounding problems of pump efficiency. The laser of the invention can achieve elliptical beam cross-section whilst still retaining extreme compactness. Elliptical surface footprint on the laser segments for a circular input beam allows very high energy and power densities referred to the circular output beam.

Figure 2:
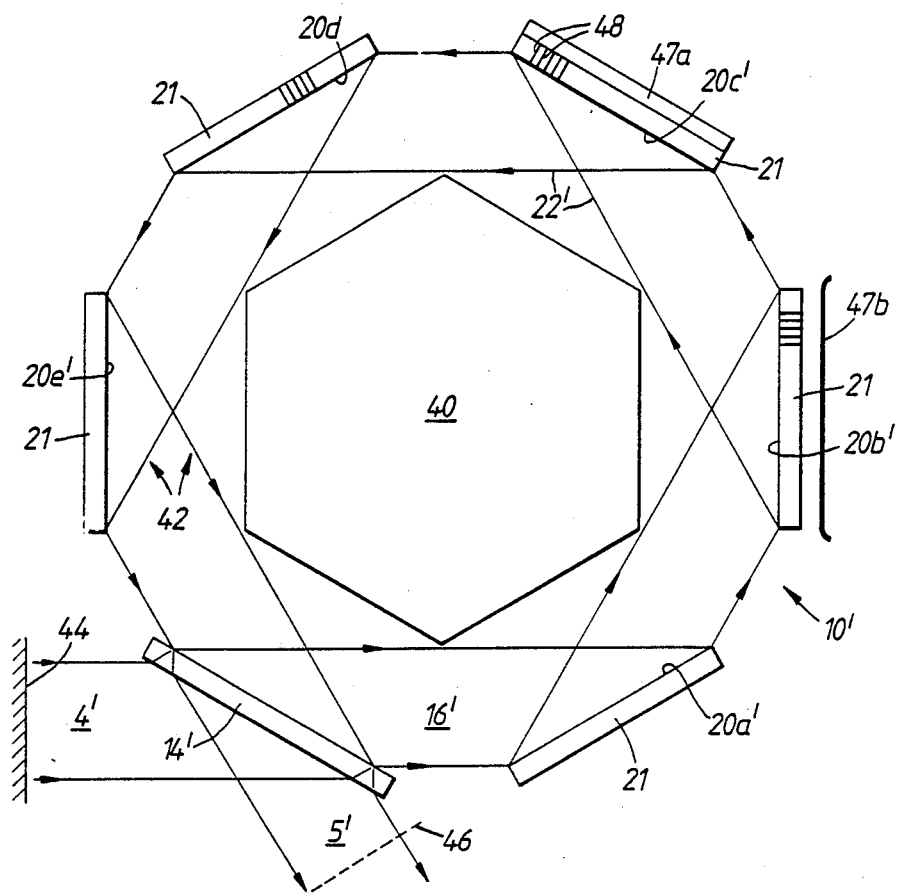
FIG. 2 is a highly schematic cross-sectional view of a second embodiment of laser apparatus according to the invention, configured as a high power gas laser resonator.

FIG. 2 depicts an alternative embodiment of the invention, configured as a high power gas laser 10'. In this case the generally cylindrical hexagonal bounding structure for cavity 16' includes a window 14' and five plates 21 which also have reflective front surfaces serving as mirror 20'. In use, cavity 16' is filled with a laser gas which is excited by electrical discharge between a central hexagonal electrode 40, shaped to allow even discharge, and the mirrors 20' serving as a segmented outer electrode 42. Incident light beam 4' and light generated thereby follow the hexagonal light path 22', just as with the embodiment of FIG. 1, and exit as laser beam 5'. Again, the light path will typically spiral along the length of cavity 16'.

With one traversal, the apparatus is configured as an amplifier, but it may be configured as a laser resonator by providing respective reflective interfaces or mirrors 44, 46 othogonally intersecting opposite ends of light path 22'. Mirror 44 may be 100% reflecting, while mirror 46 will typically be part-reflective, part-transmissive to permit recovery of an emitted laser beam from the resonator.

Mirrors 20' may be made electrically conductive for serving as electrode segments by being suitably metalized, as shown for the first and last mirrors 20a', 20e'. Alternatively, as depicted in FIG. 2 for the other three mirrors, each mirror may be electrically conductive by virtue of multiple conductive filaments 48 to pass the discharge current through the mirror. The inner ends of filaments 48 are exposed to cavity 16' while their outer ends contact a rear metal electrode 47a, 47b which may be spaced (47b) back from the respective mirror. The loss of reflectivity due to the presence of filaments 48 is minimal: they may be placed, for example, in a glass mirror or "pair" and be diamond machined with the rest of the front surface.

Inner electrode 40 is conveniently hollow thus housing a reservoir for gas for cavity 16'. The electrode is perforated for gas circulation and fans may be provided if necessary. Pre-ionising circuits may also be housed in electrode 40. Pre-ionisation of the gas will slow any deterioration of the electrode mirrors 20'. Cooling by heat exchange (not shown) may also be accomplished within the reservoir gas to allow continuous wave (cw) or repetitive operation.

Many of the aforementioned advantages apply to the apparatus illustrated in FIG. 2 but to these may be added the following:

the apparatus may be scaled up to very large proportions, and for very long devices an output mirror may not be required, even for resonator operation. The circular symmetry produces a very compact laser of ultra high power. For example, for a 1 meter beam diameter, a 300 meter gain-length can fit inside a cylinder 20 meters long and 7 meters in diameter;

operation at both low pressure and high pressure (up to many atmospheres) is facilitated by the circular symmetry;

the device allows very large volumes without long discharge length, and thus avoids problems associated with folded cavities;

prior direct excitation gas lasers have never been able to efficiently excite large mode volumes. The direct excitation configuration of FIG. 2 allows a very compact design in which very large mode volumes are excited. Compared to existing gas lasers such as TEA lasers, multiatmosphere $CO_2$, and E-beam lasers, the illustrated gas laser can excite 100 times the mode volume within the same external dimensions.

In a further modification (not illustrated), the illustrated gas laser may be hybridised with a low power laser operating briefly before each pump cycle, or even continuous wave. This helps reduce parasitic modes in the excited population in cavity 16', which will otherwise be expected to be present in view of the very low Fresnel number of the gas laser medium in the cavity. By hybridising as suggested, the cavity 16' can be constrained to operate in the desired mode.

Figure 3:
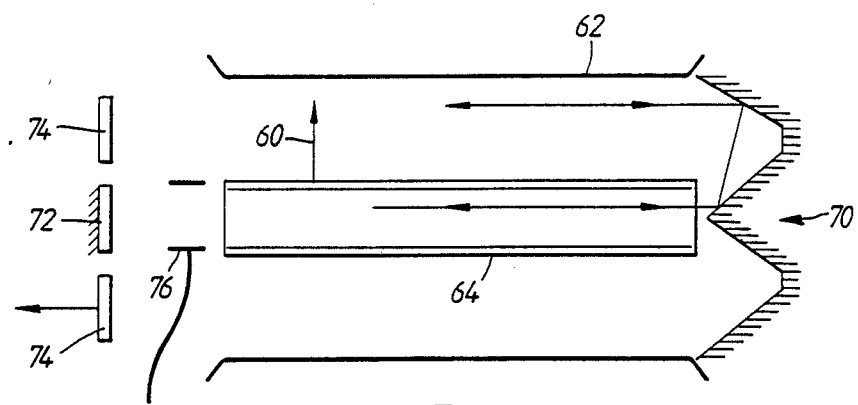
FIG. 3 shows a hybridised variation of the apparatus of FIG. 2.

FIG. 3 schematically depicts a variation using the inner (central) part of the inner electrode to house a CW or quasi-CW longitudinally-excited hybridised laser to limit the possible modes. The beam path is not now polygonal. Mirrors 70, 72 are 100% reflective. Annular output mirror 74 is 50% reflective. The Fresnel number of such configurations can be very high, giving true signal mode operation with excellent beam quality. This differs from prior lasers in that the radial discharge 60 between the cylindrical electrodes 62, 64 excites a very large mode volume, almost all of which is usable with good beam properties. Electrode 76 is for longitudinal discharge.

I claim:

1. Laser beam processing apparatus comprising;
   a body providing a generally cylindrical bounding structure for a cavity;
   means to recover a laser beam from the cavity;
   reflective means including at least five substantially flat reflective interfaces together forming a reflective structure of polygonal cross section about said cavity arranged to define in said cavity a light path for said laser beam which is generally polygonal as viewed from an end of the cavity; and
   laser material disposed in said path and arranged in plural thin segments in front of the respective interfaces to define said cylindrical bounding structure,
   wherein said reflective interfaces and said thin segments are so arranged that said light path traverses the thin dimension of each of said segments.

2. Laser apparatus according to claim 1 wherein said cross section is a regular polygon having at least five reflective sides and at least five of said segments of laser material.

3. Laser apparatus according to claim 1 wherein said reflective interfaces are elongate parallel to the axis of said cylindrical bounding structure.

4. Laser apparatus according to claim 1 wherein the front surfaces of said segments of laser material are anti-reflective to minimize reflection of light incident thereon.

5. Laser apparatus according to claim 1 wherein the segments of laser material and said adjacent reflective interfaces are separated by means for circulating cooling fluid therebetween during operation of the apparatus.

6. Laser apparatus according to claim 1 wherein the number of sides of said cross section matches the refractive index of the laser material so that light following said path enters and exits the material at or near Brewster's angle.

7. Laser apparatus according to claim 1 further including plural reflective interfaces orthogonally intersecting said light path to define an optical resonator.

8. Laser apparatus according to claim 7 wherein one of said orthogonally disposed interfaces is a part reflective, part transmissive, mirror which comprises said laser beam recovery means for the resonator.

9. Laser apparatus according to claim 1 further including means to admit an incident light beam to said cavity.

10. Laser apparatus according to claim 1 wherein said thin segments lie in planes which successively intersect the planes of adjacent segments at acute angles.

11. Laser apparatus according to claim 1 wherein said cross section is hexagonal.

12. Laser apparatus according to claim 1 wherein said laser material segments have back surfaces and said reflective interfaces are provided by a coating on the respective back surfaces of the laser material segments.

13. Laser beam processing apparatus comprising;
    a body providing a generally cylindrical bounding structure for a cavity;
    means to recover a laser beam from the cavity;
    reflective means including at least three substantially flat reflective interfaces together forming a reflective structure of polygonal cross section about said cavity arranged to define in said cavity a light path which is generally polygonal as viewed from an end of the cavity; and
    electrical discharge means for exciting gaseous laser material in said cavity, including an electrode disposed generally centrally within said cavity.

14. Laser apparatus according to claim 13 wherein said reflective means is electrically conductive.

15. Laser apparatus according to claim 14 wherein said reflective means is electrically conductive by virtue of multiple conductive filaments passing through said reflective means and having ends exposed to the cavity for passing discharge current through the reflective means.

16. Laser apparatus according to claim 13 wherein said centrally disposed electrode is hollow.

17. Laser apparatus according to claim 13 further including plural reflective interfaces orthogonally intersecting said light path to define an optical resonator.

18. Laser apparatus according to claim 17 wherein one of said orthogonally disposed interfaces is a part reflective, part transmissive, mirror which comprises said laser beam recovery means for the resonator.

19. Laser apparatus according to claim 13 further including means to admit an incident light beam to said cavity.

20. Laser apparatus according to claim 13 wherein said interfaces lie in planes which successively intersect the planes of adjacent segments at acute angles.

21. Laser apparatus according to claim 13 wherein said cross section is hexagonal.

* * * * *